United States Patent [19]
Cho et al.
[11] 3,763,359
[45] Oct. 2, 1973

[54] APPARATUS FOR EQUALIZING A TRANSMISSION SYSTEM

[75] Inventors: Yo-Sung Cho, North Andover, Mass.; Francis Charles Kelcourse, Atkinson, N.H.

[73] Assignee: Bell Telephone Laboratories, Incorporated, Murray Hill, N.J.

[22] Filed: May 15, 1972

[21] Appl. No.: 253,199

[52] U.S. Cl. 235/151, 333/18, 333/28
[51] Int. Cl. H04b 3/04
[58] Field of Search 235/151, 181, 152; 333/18, 28, 70 T; 328/162, 167; 325/42, 65

[56] References Cited

UNITED STATES PATENTS

| | | | |
|---|---|---|---|
| 3,375,473 | 3/1968 | Lucky | 333/28 X |
| 3,573,667 | 4/1971 | Kao et al. | 333/18 |
| 3,508,172 | 4/1970 | Kretzmer et al. | 333/18 |
| 3,646,480 | 2/1972 | Spaulding | 328/167 X |
| 3,657,669 | 4/1972 | Proakis | 333/18 |

*Primary Examiner*—Joseph F. Ruggiero
*Attorney*—W. J. Keefauver et al.

[57] ABSTRACT

A method of adjusting Bode network equalizers utilizes three pilot signals for each network to achieve a minimum mean-squared error in a transmission system. These pilot signals, which are located at the center frequency of the network and half way between it and the center frequencies of the adjacent networks, are passed through the system and compared with a reference signal in order to generate error terms. A method of manually minimizing the error terms according to an iterative process and apparatus for automatically reducing it according to a steepest descent process are used to produce the minimum mean squared error.

4 Claims, 5 Drawing Figures

APPARATUS FOR EQUALIZING A TRANSMISSION SYSTEM

BACKGROUND OF THE INVENTION

This invention relates to equalization in transmission systems and, more particularly, to the achievement of a minimum mean-squared error in such systems.

When signals are sent over great distances on coaxial or other types of transmission lines, a large amount of distortion is developed in the transmitted signal. Part of this distortion is substantially constant and is due to the inherent characteristics of the transmission medium. This type of distortion can be corrected by manually adjusting equalizers, which causes the overall transmission line to have a relatively flat frequency response. The other part of the distortion is caused by variations in the transmission medium's characteristics due to temperature variations and aging of the components. Automatically adjustable equalizers are used to correct this type of distortion. A simple form of equalizer networks consists of series-connected Bode networks, which have their frequency response spaced throughout the band of interest and have individually adjustable gains. These gains are then adjusted to equalize the transmission line. Two basic methods are typically used to accomplish the adjustment of both manual and automatic equalizers. The first requires that the transmission line be taken out of service and a sweep signal be applied to it. Then the equalizer, which is attached to the receiving end of the transmission line, has its output compared with a reference signal. The error signal that is generated by this comparison is then used to adjust the various gains of the equalizer. This will result in equalizer settings which produce the minimum mean-squared error. The second method for adjusting equalizer gains requires the transmission of pilot tones located at the center frequency of each of the Bode networks. The output of the equalizer at each pilot tone is then compared to reference signals, thereby creating error signals. The gain of each equalizer section is then adjusted until the error term associated with it is identically zero. This is generally referred to as the "zero-forcing" method. Since the pilot tones in the zero-forcing method are at discrete frequencies, they can be sent along with the normal message signals and there is no need to take the transmission line out of service. However, this method does not generally result in a minimum mean-squared error.

It is an object of this invention to achieve a substantially minimum mean-squared error gain adjustment of the equalizer without taking the transmission line out of service.

SUMMARY OF THE INVENTION

The present invention is directed to providing a means for minimizing the mean-squared error in an equalized communication system. In an illustrative embodiment of the invention, an equalizer is used which is made up of series-connected Bode networks whose frequency response characteristics are uniformly spaced throughout the band of interest. Three pilot tones for each Bode network are then transmitted through a transmission line to the equalizer. One tone is located at the center frequency of each network and the other tones are located half way between the center frequency of the network in question and the center frequency of its two adjacent networks. The output of the equalizer at the frequencies of the various pilot tones is compared with a reference signal and error terms equal to the difference between the two signals are generated. It has been shown that when the Bode network gain is adjusted so as to reduce to zero the sum of the errors at the center frequency error and half the two side frequency errors, the minimum mean-squared error is produced. In automatic equalizers this minimization is performed by applying the three error terms for each network to an operational amplifier which sums and integrates them in the proper ratio. The output of the operational amplifier is then summed with the former gain setting of the equalizer to generate a new gain setting. Mathematically, this represents a correction by the steepest descent method. When the equalizers are to be adjusted manually, the gains are adjusted so that the errors at the center frequencies are initially zero. Then the gain adjustments are corrected in an iterative manner so that the sum of the errors at the center frequencies and half the errors at the two side frequencies of each network are at a zero. This represents a Seidel iterative method.

The foregoing and other features of the present invention will be more readily apparent from the following detailed description and drawings.

DETAILED DESCRIPTION

Figure 1B:
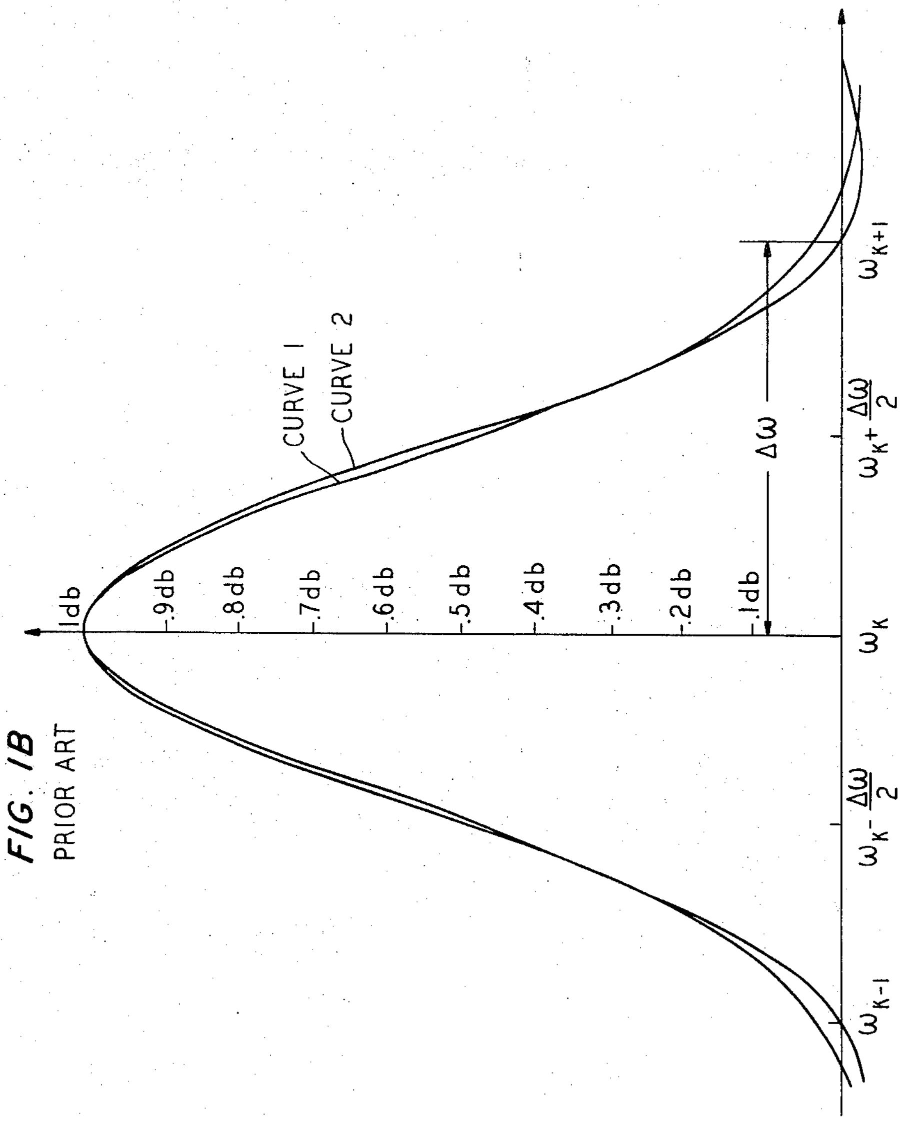
FIG. 1B PRIOR ART
FIG. 1B shows a curve of the actual frequency response of the network of FIG. 1A and a mathematical approximation to that frequency response.
Figure 1A:
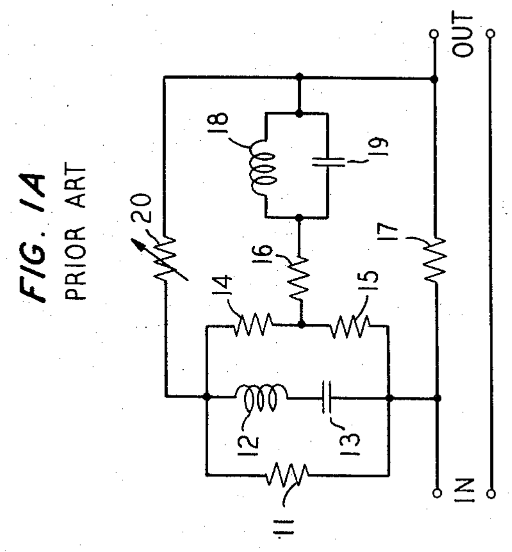
FIG. 1A PRIOR ART
FIG. 1A is a schematic diagram of a typical Bode network useful in the present invention.

The network shown schematically in FIG. 1A is a typical Bode network, whose insertion loss can be expressed as $$A = g\ R_e \exp(-2\phi) \quad \text{(dB)} \tag{1}$$

where $\phi$ is the transfer constant of the network, which is a function of frequency and $g$ is a real constant representing the gain of the network. The resistance 20 of FIG. 1A determines the value of $g$. The $\phi$ term depends on the values of the other components in FIG. 1A and the input frequency. Once all the components are determined, the input-output transfer function of the kth network of the series of Bode networks which make up the equalizer is $$A_k(\omega) = g_k\ B_k(\omega) \tag{2}$$

where $$B_k(\omega) = [G_k\ (1 + G_k) + D_k]^2 - D_k/[(1 + G_k)^2 + D_k]^2 \tag{3}$$

$$G_k = R_{ok}/R_{11}, \quad R_{ok} = R_{14} = R_{15},$$

$$D_k = (\omega/\omega_k)\, H_k/(\omega/\omega_k)^2-1, \; H_k = R_{ok} \sqrt{C_{13}/L_{12}}$$

and $$\omega_k = \log 1/2\pi \sqrt{L_{12}\, C_{12}}.$$

The subscripts in these expressions refer to the numerical designations in FIG. 1A unless otherwise specified.

Curve 1 of FIG. 1B is a graphical representation of Equations (2) and (3). While these equations can be used to explain the present invention, a much simpler approach can be taken by representing the function $B_k(\omega)$ of the Bode network by the expression $$B_k(\omega) = \frac{\sin \frac{\pi}{\Delta\omega}(\omega-\omega_k)}{\frac{\pi}{\Delta\omega}(\omega-\omega_k)} \cdot \frac{\cos \frac{\pi}{\Delta\omega}(\omega-\omega_k)}{1-4\left(\frac{\omega-\omega_k}{\Delta\omega}\right)^2} \quad (4)$$

where $\Delta\omega$ is the distance from the center frequency $\omega_k$ to the first zero crossing. Curve 2 of FIG. 1B illustrates that the result of such a substitution is an expression which closely approximates the actual transfer function of the network.

Using this approximation, the frequency domain response of the equalizer can be written as $$EQL(\omega) = \sum_{k=0}^{N-1} g_k B_k(\omega)\,(dB) \quad (5)$$

where N is the number of Bode networks in the equalizer.

An error function can now be defined as $$E(\omega) = EQL(\omega) - M(\omega) + I(\omega) \quad (dB) \quad (6)$$

where $M(\omega)$ is the channel misalignment and $I(\omega)$ is an input function. The mean-squared error (MSE) can then be defined as $$MSE = \frac{1}{T_m}\int_{-T_m}^{T_m} e(t)^2 dt$$

where $T_m$ is a positive constant and $e(t)$ is the time domain expression of $E(\omega)$. Simplifying the expression and using Parserval's theorem yields:

$$MSE = \int_{-\infty}^{\infty} E(\omega)^2 d\omega. \quad (7)$$

Once the equalizer has been physically realized, the $\Delta\omega$ term of Equation (4) usually cannot be controlled. Hence, optimization of a transmission channel consists of determining the gain parameters, $g_k$, which will minimize the value of MSE.

One approach to the optimization utilizes the steepest descent method, which requires the present values of the various gains to be changed by small amounts in the opposite direction of certain gradients, which are the partial derivatives of MSE with respect to each gain parameter, $g_k$. This process is continued until all the gradients with respect to the gains reach zero or a stationary point. Any particular gradient is determined from Equations (6) and (7) when $I(\omega) = 0$, by the expression $$G_k = \frac{\partial(MSE)}{\partial g_k} = 2\int_{-\infty}^{\infty} B_k(\omega) E(\omega)\, d\omega. \quad (8)$$

This shows that the gradient $G_k$ of gain $g_k$ is found simply by cross-correlating the Bode network function, $B_k(\omega)$, and the error function, $E(\omega)$. If $G_{kj}$ is defined to be the gradient at the time $t = j$, then according to the steepest descent method, the next setting of $g_{kj}$ is $$g_{kj+1} = g_{kj} - \Delta c G_{kj} \quad (9)$$

where $\Delta c$ is a small positive constant. When the time interval $\Delta t = t_{j+1} - t_j$ is sufficiently small Equation (9) can be written as $$g_k(T) = g_{ko} - \Delta c \int_0^T \int_{-\infty}^{\infty} B_k(\omega) E(\omega)_t\, d\omega dt \quad (10)$$

where $g_{ko}$ is an initial value of gain $g_k$ and $E(\omega)_t$ is the error function at time $t$. The optimum value of $g_k$ is obtained as $T \to \infty$. This method can be implemented by applying a periodic sweep signal to the system and correcting the gains after each sweep. However, as will be shown, a much simpler technique can be used to arrive at an optimum setting.

It can be shown that the frequency domain characteristic of a coaxial cable channel is represented by $$C(\omega) = -M(\omega) = \sum_{n=0}^{N} [F_n \cos(2\pi P_n \omega) + H_n \sin(2\pi P_n \omega)] \quad (11)$$

where the $F_n$'s and $H_n$'s are real constants, and the $P_n$'s are positive constants having the following relationship, $P_n > P_{n-1} > \ldots P_1 > P_o \geq 0$. Let $P_n < 2 P_e$ where $P_n$ and $P_e$ are the time limits of the highest ripples found in the channel and the channel ripples on which the networks are initially designed for the equalization, respectively. Then from Equations (6) and (8) with $I(\omega) = 0$ $$G_k = G_{k1} + G_{k2}$$

where $$G_{k1} = 2\int_{-\infty}^{\infty} B_k(\omega) EQL(\omega)\, d\omega$$

and $$G_{k2} = -2\int_{-\infty}^{\infty} B_k(\omega) M(\omega)\, d\omega$$

Now $$G_{k1} = 2\int_{-\infty}^{\infty} B_k(\omega) \sum_{l=0}^{N-1} g_l B_l(\omega)\, d\omega.$$

Using Parserval's relationship and substituting in the time domain functions for $b_k$ and $b_i$ $$G_{k1} = 2\Delta\omega\ [\tfrac{1}{2}\ EQL\ (\omega_k - \Delta\omega/2) + EQL\ (\omega_k) + \tfrac{1}{2}\ EQL\ (\omega_k + \Delta\omega/2)] \quad (12)$$

Substituting Equation (11) into the expression for $G_{k2}$ and carrying out the indicated operations yields $$G_{k2} = 2\Delta\omega[\tfrac{1}{2}M(\omega_k - \Delta\omega/2) + M(\omega_k) + \tfrac{1}{2}\ M(\omega_k + \Delta\omega/2)] \quad (13)$$

Combining Equations (12) and (13) yields $$G_k = 2\Delta\omega\ [\tfrac{1}{2}\ E\ (\omega_k - \Delta\omega/2) + E\ (\omega_k) + \tfrac{1}{2}\ E\ (\omega_k + \Delta\omega/2)]$$

Therefore, the equation for the optimum gain adjustment using this new algorithm and Equation (10) is $$g_k(T) = g_k(o) - 2\Delta c\Delta\omega\int_0^T \left[1/2E\left(\omega_k - \frac{\Delta\omega}{2}\right) + E(\omega_k) + 1/2E\left(\omega_k + \frac{\Delta\omega}{2}\right)\right]dt. \quad (14)$$

Figure 2:
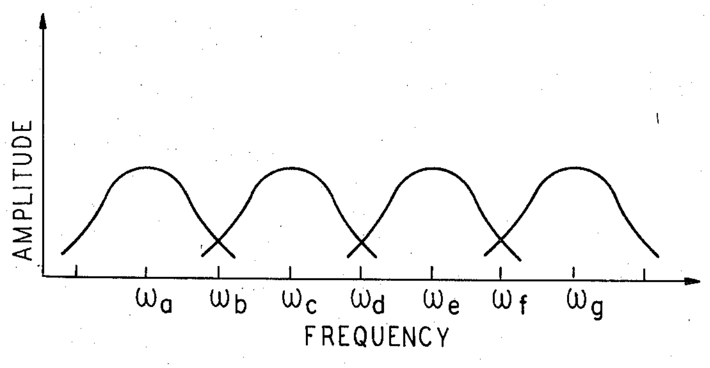
FIG. 2 is a graph of the placement of the various pilot tones in relation to the frequency response of the Bode networks.

This algorithm can be implemented by transmitting 2N-1 pilot tones over the transmission system, where N is the number of Bode networks in the equalizer. These tones are located at the frequencies $\omega_o$, $\omega_o + \Delta\omega/2$, $\omega_1$, $\omega_1 + \Delta\omega/2$, . . . $\omega_{N-1} - \Delta\omega/2$, and $\omega_{N-1}$ . FIG. 2 shows the transfer functions of four Bode networks and the placement of the various pilot tones. It should be noted that only two pilot tones are used for the first and last networks. This can be done because an analysis similar to that for Equation (14) yields $$G_o = 2\Delta\omega\ [E(\omega_o) + \tfrac{1}{2}\ E\ (\omega_o + \Delta\omega/2)] \quad (15)$$

for the first gradient and $$G_{N-1} = 2\Delta\omega\ [\tfrac{1}{2}\ E\ (\omega_{N-1} - \Delta\omega/2) + E\ (\omega_{N-1})] \quad (16)$$

for the last gradient.

Figure 3:
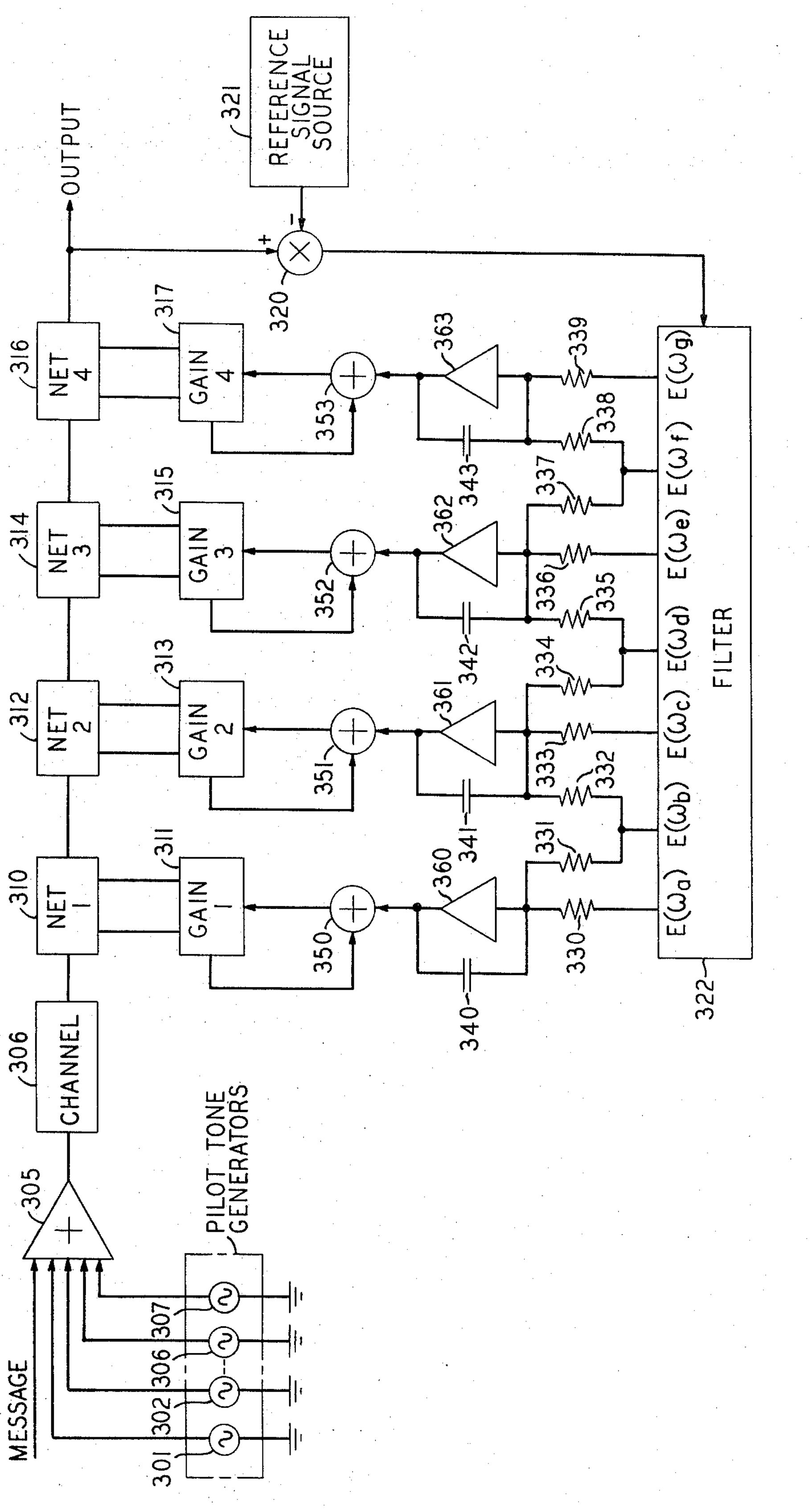
FIG. 3 is a schematic diagram of an automatic equalizer utilizing the principles of the present invention.

FIG. 3 is a schematic diagram of an illustrative embodiment of the present invention, using the steepest descent method. In this circuit, four Bode networks, corresponding to the curves of FIG. 4, are used, but this should not be interpreted to mean that the invention is limited to any particular number of networks.

The message to be transmitted over the communication channel is applied to one of the inputs of summing amplifier 305. In addition to this signal, the outputs of pilot tone generators 301 through 307 are also applied to various inputs of summing amplifier 305. These pilot tone generators produce uniform amplitude frequency tones at the frequencies $\omega_a$ through $\omega_g$, as shown in FIG. 2. In general, the message signal can be arranged so that none of its components are in the region where the pilot tones are located. The output of amplifier 305, which is the message signal with the pilot tones interspersed, is then applied to the communications channel 306. At the receiving end of the communications channel, the equalizer, comprising Bode networks 310, 312, 314 and 316, corrects for any distortion due to transmission over the channel. As shown in FIG. 3, the Bode networks are connected in series and each one has a separate gain adjustment, represented by devices 311, 313, 315 and 317. The output of the equalizer, which is also the output of Bode network 316, is applied to the positive input of summing junction 320. A reference signal from reference signal source 321 is applied to the negative input of summing junction 320. Since the reference signal source generates a series of pilot tones which are equal in frequency and amplitude to the transmitted pilot tones, the output of summing junction 320 will represent the amount of distortion remaining in the signal after equalization. This error signal is then applied to filter 322, which separates it into error signals at the pilot tone frequencies. These error signals associated with particular pilot tones are then applied through resistors 330 through 339 to amplifiers 360 through 364. The resistors designated 331, 332, 334, 335, 337 and 338 are equal in value and have twice the value of resistors 330, 333, 336 and 339, which are also equal in value. Because of this ratio of resistances, the errors at the center frequencies of the Bode networks are combined with half the errors at the side frequencies, as called for by Equations (14), (15) and (16). The amplifiers 360 through 363 have capacitors 340 through 343 connected between their respective inputs and outputs. This causes the amplifiers to function as integrators, in further compliance with Equations (14), (15) and (16). The outputs of these amplifiers are added to signals which represent the present gain setting of the equalizers in summing junctions 350 through 353. This produces a signal which determines what the next gain setting of the equalizers should be.

In summary, the necessary pilot tones are transmitted through the channel and the equalizer, and are compared with reference signals. The error signals generated by this comparison are then associated with particular pilot tones and are combined and integrated according to Equation (14). This correction is then added to the present gain setting of the equalizer in order to generate a signal specifying the next gain setting. When this process is continued, the various gains will be adjusted until the combination of error terms is zero. As has been shown by the previous equations, this results in a minimum mean-squared error for the combination transmission line and equalizer.

Figure 4:
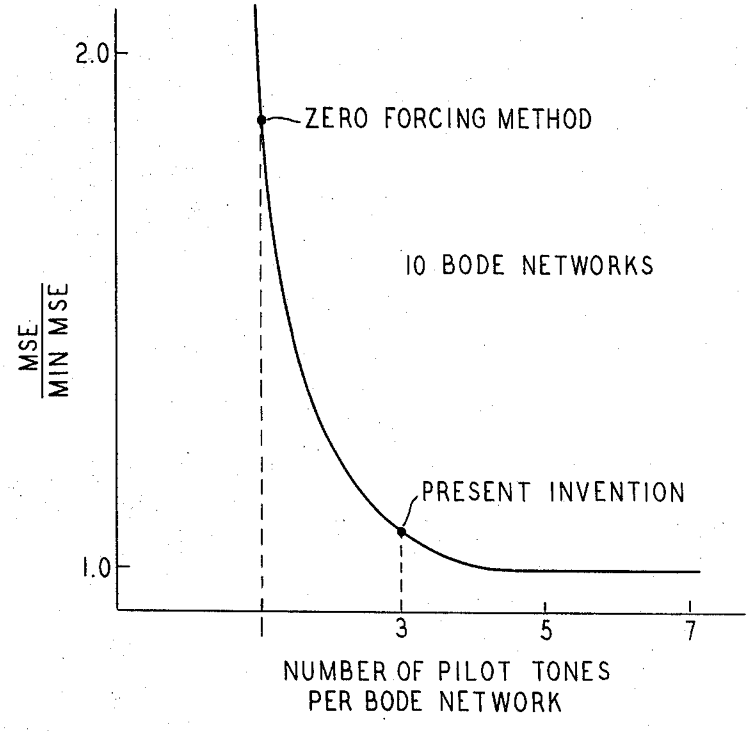
FIG. 4 is a graph of mean-squared error in relation to the method of equalizer adjustment employed.

FIG. 4 is a plot of the relative reduction in mean-squared error with the addition of pilot tones. The data used to generate this graph was developed from a computer simulation of ten Bode networks and the absolute minimum error was calculated by assuming a sweep frequency generator. The other two points on the curve were determined using the method of the present invention and the zero-forcing method. As mentioned previously, the zero-forcing method requires one pilot tone at the center frequency of each network and the adjustment of the gain until the error at the center frequency is zero. From the curve of FIG. 4 it can be seen that a significant improvement in channel correction is accomplished by the addition of a few pilot tones if they are placed according to the principles of this invention. The fact that the absolute minimum error is not achieved with this method is due to the use of the approximation for the transfer function of the Bode networks which yielded the simple relationship for the placement of the pilot tones.

When the equalizer is to be adjusted manually, the steepest descent method cannot be used easily, since it requires simultaneous adjustment of all the gain settings. Instead, it is better to use a method which requires only one gradient at a time, approaches the minimum MSE, and utilizes the human factor to reduce the necessary hardware. The Seidel iterative method of the present invention meets these conditions. With this method a visual display of the gradient of the MSE with respect to each gain setting is obtained. Then the first gain setting is adjusted until its gradient becomes zero, followed by successive adjustments of the various gain settings until their corresponding gradients become zero, thus completing one iteration. After this, the entire process is repeated until all of the gradients are simultaneously zero. A minimum MSE is achieved with this method if the gradients are determined by the principles of this invention; that is, by using three pilot tones for each network.

While this method might seem cumbersome, in fact the number of iterations needed to optimize the equalizer is very small. When the equalizer is composed of orthogonal networks, a single iteration is sufficient and when it consists of semi-orthogonal terms, two or three iterations are satisfactory. In order to reduce the number of iterations, the zero-forcing method can be used to achieve the initial gain settings.

The amount of hardware needed to use this method is less than that needed for the steepest descent method. In particular, the summing junctions 350 to 353, amplifiers 360 to 363, capacitors 340 to 343 and resistors 330 to 339 of FIG. 2 can be eliminated. These parts can be replaced by four summing junctions which produce the gradients; for example, $$G_2 = \tfrac{1}{2}\,E(\omega_b) + E\,(\omega_c) + \tfrac{1}{2}\,E\,(\omega_d) \qquad (17)$$

The operator then monitors the output of each summing junction as he adjusts the corresponding gain setting. This results in a closer approximation to the minimum MSE than the zero-forcing method because the gradients determined by this method are more accurate.

To make the adjustment procedure easier, a programmable transmission measuring set can be used to obtain the gradient. For example, to generate $G_2$ in Equation (17), a transmitter, which replaces the pilot tone generators 301 through 307 in FIG. 3, can be used to generate the three pilot frequencies $\omega_b$, $\omega_c$ and $\omega_d$ sequentially. Then with the receiver synchronized to the three incoming frequencies, the errors, $E(\omega_b)$, $E(\omega_c)$ and $E(\omega_d)$ are measured and the gradient is formulated according to Equation (17). This receiving circuit can replace the filters, summing resistors, integrating capacitors and amplifiers in FIG. 3.

In order to calculate the gradient information, Equations (14), (15), (16) or (17) have been used. These Equations, however, are obtained under the idealized assumptions about the transfer characteristics of the Bode networks and the equalizer. In reality, there are degrees of deviation in the assumption and hence more precise gradient information for the physically realized network $B_k(\omega)$ can be obtained by the following equation:

$$G_k = B_k(\omega_{k1})E(\omega_{k1}) + B_k(\omega_{k2})E(\omega_{k2}) + B_k(\omega_{k3})E(\omega_{k3}) \qquad (18)$$

where $\omega_{k2}$ is the center frequency of the Bode network $B_k(\omega)$, and $\omega_{k1}$ and $\omega_{k3}$ are lower and upper side frequencies of $B_k(\omega)$, respectively. It should be noted that Equations (14), (15), (16) and (17) are special cases of Equation (18) and that Equation (18) requires the actual measurement of the response of each Bode network at the pilot frequencies before it can be used.

While the invention has been particularly shown and described with reference to preferred embodiments thereof, it will be understood by those skilled in the art that various changes in form and details may be made therein without departing from the spirit and scope of the invention.

We claim:

1. Apparatus for equalizing a segment of a transmission line comprising a transmitting means connected to one end of said segment of transmission line for introducing a plurality of pilot signals into said segment of said transmission line, an equalizer connected to the other end of said segment of transmission line comprising at least one adjustable Bode network, the said one Bode network being adapted to equalize a predetermined band of frequencies, said plurality of pilot signals comprising an individual signal at the center of the band of frequencies equalized by the said Bode network, and individual signals at the frequencies midway between the center frequency and the upper and lower limits of the band of frequencies equalized by the Bode network, comparing means connected to said equalizer for comparing the pilot signals after transmission through said equalizer and said segment of said transmission line with reference signals and generating a plurality of error signals therefrom, and means connected between said comparing means and said equalizer to adjust the gain of the Bode network so that the sum of the error signal at the center frequency of the Bode network and the error signals at its adjacent pilot frequencies, multiplied by the relative Bode network gain at these frequencies, is substantially equal to zero.

2. Apparatus in accordance with claim 1 wherein said equalizer comprises a plurality of adjustable Bode networks, each of said Bode networks being adapted to equalize an individual predetermined band of frequencies having a center frequency and an upper frequency and a lower frequency, the center frequency of adjacent Bode networks being respectively at the upper and lower frequencies of said individual predetermined band of frequencies to provide continuous equalization over the entire frequency spectrum to be equalized, said plurality of pilot signals comprising an individual signal at the center frequency of each of said plurality of Bode networks and individual signals at frequencies midway between the center frequency and the upper and lower frequencies of said individual band of frequencies of each of said Bode networks.

3. Apparatus as claimed in claim 1 wherein the relative Bode network gain equals one-half at the pilot frequencies adjacent to the center frequencies.

4. Apparatus as claimed in claim 1 wherein said means for adjusting the gain comprises a steepest descent circuit, comprising:

means for generating a first sum signal by adding the error signal at the center frequency of the said Bode network to half the error signals at its adjacent pilot frequencies;

means for integrating the first sum signal to obtain an integrated first sum signal;

means for generating a first gain signal representing the gain setting of the said Bode network;

means for generating a second sum signal by adding the integrated first sum signal to the first gain signal; and means for varying the gain setting of the said Bode network in response to the second sum signal.

* * * * *